(12) United States Patent
Morawek

(10) Patent No.: US 9,772,199 B2
(45) Date of Patent: Sep. 26, 2017

(54) METHOD AND APPARATUS FOR DETERMINING THE POSITION OF A MOTOR-DRIVEN ACTUATING PART

(71) Applicant: Continental Automotive GmbH, Hannover (DE)

(72) Inventor: Roman Morawek, Vienna (AT)

(73) Assignee: Continental Automotive GmbH, Hanover (DE)

( * ) Notice: Subject to any disclaimer, the term of this patent is extended or adjusted under 35 U.S.C. 154(b) by 341 days.

(21) Appl. No.: 14/423,572

(22) PCT Filed: Aug. 1, 2013

(86) PCT No.: PCT/EP2013/066172
§ 371 (c)(1),
(2) Date: Feb. 24, 2015

(87) PCT Pub. No.: WO2014/032900
PCT Pub. Date: Mar. 6, 2014

(65) Prior Publication Data
US 2015/0219473 A1    Aug. 6, 2015

(30) Foreign Application Priority Data
Aug. 28, 2012    (DE) .................. 10 2012 215 214

(51) Int. Cl.
*G01D 5/14*    (2006.01)
*G01D 5/244*    (2006.01)

(52) U.S. Cl.
CPC .......... *G01D 5/142* (2013.01); *G01D 5/2449* (2013.01); *G01D 5/24476* (2013.01)

(58) Field of Classification Search
CPC ... G01D 5/142; G01D 5/24476; G01D 5/2449
See application file for complete search history.

(56) References Cited

U.S. PATENT DOCUMENTS 5,347,227 A    9/1994    Bortolini
5,347,277 A    9/1994    Nondahl
(Continued)

FOREIGN PATENT DOCUMENTS

CN    1882822    12/2006
CN    101334671    12/2008
(Continued)

OTHER PUBLICATIONS

First Chinese Office Action dated Mar. 3, 2016 in Chinese Application No. 201380056456.3, including English translation.
(Continued)

*Primary Examiner* — Kyoung Lee
(74) *Attorney, Agent, or Firm* — RatnerPrestia

(57) ABSTRACT

A method and apparatus for determining the position of a motor-driven actuating part, in particular a window, a sliding roof, a boot lid, a sliding door or a seat, wherein a current position is determined and, in order to determine the current position, a position newly determined for this purpose is taken into account in conjunction with a last valid position, wherein the current position is selected to be between these two positions and closer to that position which has a comparatively lower uncertainty.

22 Claims, 3 Drawing Sheets

(56) References Cited

U.S. PATENT DOCUMENTS

| | | | |
|---|---|---|---|
| 6,747,399 B1 * | 6/2004 | Ogino | B60J 10/00 |
| | | | 310/319 |
| 7,307,395 B2 | 12/2007 | Bouamra | |
| 7,401,001 B2 | 7/2008 | Stek | |
| 8,035,328 B2 | 10/2011 | Noda | |
| 8,255,123 B2 | 8/2012 | Lenneman | |
| 8,412,403 B2 | 4/2013 | Kollner | |
| 8,461,786 B2 | 6/2013 | Morawek | |
| 8,742,714 B2 | 6/2014 | Holzmann | |
| 2010/0097026 A1 | 4/2010 | Holzmann | |
| 2015/0219473 A1 | 8/2015 | Morawek | |

FOREIGN PATENT DOCUMENTS

| | | |
|---|---|---|
| CN | 101828095 | 9/2010 |
| DE | 20221068 | 2/2005 |
| DE | 69917485 | 5/2005 |
| DE | 102007050173 | 11/2008 |
| DE | 102009001762 | 12/2009 |
| DE | 102009031083 | 1/2010 |
| EP | 2102725 | 9/2009 |
| WO | 2008071538 | 6/2008 |
| WO | 2009065699 | 5/2009 |
| WO | 2014032900 | 3/2014 |

OTHER PUBLICATIONS

International Search Report for International Application No. PCT/EP2013/066172 dated Dec. 2, 2013.
German Examination Report for German Application No. 10 2012 215 214.8 dated Mar. 28, 2013.
Japanese Office Action dated Mar. 14, 2016 in Japanese Application No. 2015-528937, with English translation.

* cited by examiner

METHOD AND APPARATUS FOR DETERMINING THE POSITION OF A MOTOR-DRIVEN ACTUATING PART

CROSS REFERENCE TO RELATED APPLICATIONS

This application is the U.S. National Phase Application of PCT International Application No. PCT/EP2013/066172, filed Aug. 1, 2013, which claims priority to German Patent Application No. 10 2012 215 214.8, filed Aug. 28, 2012, the contents of such applications being incorporated by reference herein.

FIELD OF THE INVENTION

The invention relates to a method for determining the position of a motor-driven actuating part, in particular of a window, of a sunroof, of a rear lid, of a convertible top system, of a sliding door or of a seat, wherein a current position correction value is determined by measuring the position, and an apparatus for carrying out the method with a position tracker (counter) and a position-measuring unit.

BACKGROUND OF THE INVENTION

It is necessary to determine the position of motor-driven actuating parts, in particular in the case of closing parts such as window lifters, sunroofs or sliding doors in motor vehicles, in order to stop the closing part at predefined positions and in order to be able to satisfy the legal requirements in respect of anti-trapping protection. Generally, a position-determining process can be used in a very wide variety of actuating parts such as, for example, even in seats, and also in the case of blinds or sunshades, for example in order to be able to set previously determined or stored positions.

Such position-determining methods can be differentiated into two classes:

(1) On the one hand there are counting methods which are capable of precisely detecting the position always and under all given peripheral conditions. This is usually carried out by means of a magnet wheel attached to the motor shaft, in conjunction with two Hall sensors. The two Hall sensors permit the rotation of the motor to be determined and the rotational direction to be detected.

(2) On the other hand, there are position-determining methods or position-tracking methods which can determine the position but, under certain external circumstances, cannot avoid slight errors in the position-determining process in a system-immanent fashion. Such methods include 1-Hall position counters and, in particular, sensorless methods which infer the position from, for example, the current ripple of the commutator current of a DC motor. Such position-determining processes which are subject to errors make regular correction of the position necessary. This is carried out by means of devices for measuring positions, such as, for example, an initialization process.

A method which permits the current position to be tracked by means of relative changes in position is described in EP 2 102 725 B1, which is incorporated by reference. In this document, the current position is determined from the sum of all the changes in position on the basis of an initial absolute position determination, for example in a mechanically defined initialization process. Since every change in position is subject to uncertainty, the uncertainty of the absolute position calculated therefrom increases with the number of changes in position. Therefore, regular re-initialization by means of an absolute position-determining process is necessary in order to keep the uncertainty of the positions within acceptable limits.

DE 10 2007 050 173 B3, which is incorporated by reference, describes a method for correcting positions for a motor-driven actuating part by means of a position measurement which is carried out by means of a correlation function between a force/travel reference curve and a force/travel actual curve. In this context, the correspondence between the two curves is detected as a function of a position correction value between the curves, and the current position of the actuating part at a position corrected with the correction value determined in this way is assumed. Position information from other sources, such as, for example, an already present correction value, is, however, not taken into account or is used at most as a means of initializing the correlation search. Accordingly, possibly more precise position information, i.e. such information with a lower uncertainty value than the information determined from the correlation function, is also overwritten, and this information is therefore lost.

SUMMARY OF THE INVENTION

An aspect of the invention to make available a method and an apparatus which permit, within the scope of absolute position determination, the re-use of the information acquired from earlier absolute and/or relative position determinations, with the result that, for example, any position information is not overwritten by newly determined position information which is, however, under certain circumstances relatively imprecise.

The method according to an aspect of the invention of the type specified at the beginning solves this in that in order to determine the current position two input variables are taken into account, specifically (1) position tracking (counting) which is subject to errors and (2) position measurement which is subject to errors, wherein the newly determined position is selected between these two positions and closer to that position which has a comparatively lower uncertainty value.

Accordingly, the apparatus according to an aspect of the invention has an averaging unit which is configured to determine the current position and is connected to the position-measuring unit and to the position tracker, wherein the averaging unit is configured to take into account the determined difference in position and the last valid position determined by the position tracker.

In the present method, the last valid position information is therefore not unconditionally rejected but instead it causes a current position which differs generally from the newly determined position to be used for position determination. Depending on the uncertainty value of the position which is present and of the newly determined position, the current position is selected closer to the less precise position of the two positions, with the result that that value with the lower uncertainty has a greater influence on the detection of the current position. These advantages are achieved by the averaging unit in the present apparatus.

One possible way of implementing the position-measuring unit is, for example, to examine the force profile, the rotational speed profile or the current profile of the drive motor for characteristic points. A characteristic point can be for example a strong rise in force such as occurs, for example, in the case of wind deflectors of sunroofs. All that is essential is that the characteristic point always occurs at the same position of the actuating part, which, for example in the case of a wind deflector, would be that position at which the wind deflector engages mechanically in the movement sequence of the sunroof. The evaluation of the profile in the position-measuring unit identifies the characteristic point and infers a predefined position therefrom. Another, particularly preferred possible way of implementing the position-measuring unit is the use of the correlation function according to DE 10 2007 050 173 B3. The advantage of such a measuring unit is the independence of absolute mechanical reference points.

In a position-measuring unit by means of a correlation function, in particular force/travel curves or other characteristic number/travel curves are suitable as the characteristic curves for use in conjunction with said correlation function, wherein the characteristic number advantageously correlates with the force, for example current/travel curves or rotational speed/travel curves. However, in principle, all characteristic curves which are associated with the travel and have an aperiodic profile are suitable for this. Correspondingly, a characteristic curve-detection unit is advantageously connected to the position tracker and is configured to record force/travel curves or other characteristic number/travel curves, for example current/travel curves or rotational speed/travel curves, wherein the characteristic number correlates with the force.

Since the uncertainty of the position which is newly determined from the correlation function can depend strongly on the profile of the characteristic curves used, it is advantageous if an uncertainty value is determined from the correlation function and is assigned to the position determined from the same correlation function. For this purpose it is advantageous if the correlation unit of the apparatus according to the invention is configured to determine an uncertainty value which is provided for transmission to the averaging unit together with the difference in position. Other possibilities, such as an uncertainty value which is assumed to be constant or an uncertainty value which is estimated from other parameters, are indeed possibly easier to determine, but would at any rate have to be conservative estimates since, i.e. they would over-estimate the uncertainty value of the determined position and therefore adversely affect the position determination.

In addition to the combination of the position values it is advantageous if the uncertainty values of the two positions are also combined and an uncertainty value of the current position is determined from the uncertainty value of the newly determined and the last valid position. Typically, the resulting uncertainty value here is lower than the two original uncertainty values, which reflects the gain in information as a result of the combination of the position values. For this reason it is advantageous if the averaging unit is configured to process a position uncertainty value which is made available by the position tracker, and an uncertainty value of the position determination.

In order to determine the corrected position, the positions from the position tracker and the position-measuring unit are preferably each taken into account in an inversely proportional fashion with respect to their uncertainty value. This easily ensures that that value with the relatively high level of uncertainty is taken into account to a lesser degree than that value with a relatively low level of uncertainty. The values which are taken into account are accordingly weighted with the reciprocal value of the respective uncertainty value. A special case which occurs here is the situation of a perfectly known value, for example owing to re-initialization at a mechanically precisely defined reference position, which value therefore cannot be influenced by a value determined from the measuring unit, since said value has an uncertainty value of zero and therefore has, as it were, an infinite influence or an infinite weighting.

If the positions used are mean values of a Gaussian distribution and the determined uncertainty values are the variances thereof, the current position and the uncertainty value thereof can be determined particularly advantageously by using a Kalman filter from the newly determined and the last valid position, as well as the respective uncertainty value thereof. The Kalman filter is under these circumstances an optimum linear filter. Advantageously, the averaging unit therefore has a Kalman filter.

In order to permit, in addition to the absolute position determination by means of a correlation function, also the absolute position determination when starting from fixed, known positions, it is possible, for example in the case of a starting process from a known initial position or position of rest, for the current position value and the uncertainty value thereof to be each essentially initialized with zero before the first change in position. The initialization of the uncertainty value with zero corresponds to a perfectly known position, which is appropriate during the starting process, since the initial position corresponds by definition to the zero position.

In order to make available a continuously updated position of the actuating part between the absolute position determinations it is advantageous if the position tracker is connected to a position memory in order to detect changes in position and perform updating. The position of the actuating part is tracked by a method which is (slightly) subject to errors, wherein the uncertainty value of the current position is increased in the event of a change in position. This can involve, for example, ripple counting or the evaluation of the signals of a Hall sensor. The uncertainty values of independent measurements (such as, in fact, ripple counting or the Hall sensor) are usually easily added, with the result that although the current position can be estimated after a plurality of changes in position, the associated uncertainty value increases with an increasing number of relative position measurements.

BRIEF DESCRIPTION OF THE DRAWINGS

Aspects of the invention will be further explained below on the basis of particularly preferred exemplary embodiments, to which it is, however, not intended to be restricted, and with reference to the drawing, in which, in detail.

DETAILED DESCRIPTION OF THE PREFERRED EMBODIMENTS

Figure 1:
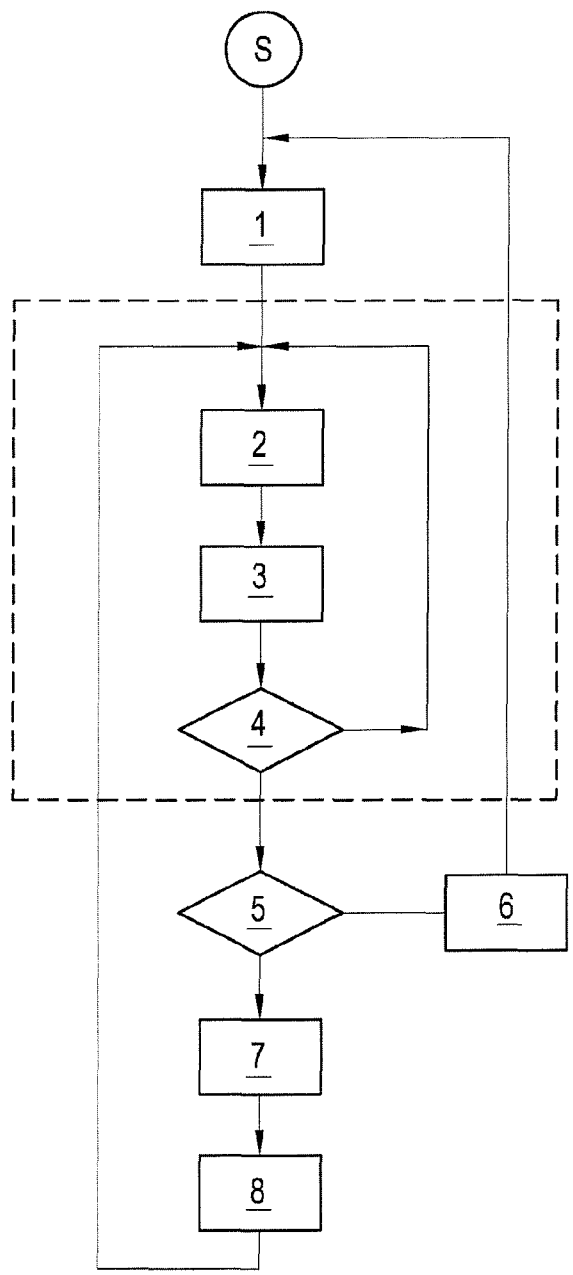
FIG. 1 shows a flowchart of a method for continuously determining the position of an actuating part including the method according to the invention.

The method illustrated in FIG. 1 begins after a start S with initialization 1 of the position counting or of the position tracking. Here, both the reference position and the uncertainty value of the reference position are initialized with zero. Before the coming movement of the actuating part, the exact position thereof is therefore known. As soon as the actuating part is used, for example if a window lifter or a sunroof is activated, a change 2 in position takes place. In order to be able to make an estimation of the current position after the change 2 in position, the change 2 in position is tracked by a suitable method 3. The tracking method 3 adapts the current counting position on the basis of the recorded change 2 in position and at the same time increases the uncertainty value thereof in accordance with the uncertainty value which is to be provided for the detection of the change in the method 3 used. As long as no new initialization is triggered, the steps of the change 2 in position and the tracking method 3 are repeated. The uncertainty value assigned to the counting position grows accordingly as the number of changes 2 in position increases. The absolute value by which the uncertainty is increased is determined by the tracking method 3 used, for example it can involve a fuzziness interval which is increased only when deviations from a known signal pattern are registered. However, a constant increase, for example by a defined empirical value, can also be implemented at the end of each movement tracking process.

At the latest, when the uncertainty value of the current reference position exceeds an acceptable maximum, re-standardization is triggered at the branch 4, wherein the re-standardization can take place in two ways in the method illustrated, which is illustrated by means of the subsequent branch 5. The one option is the approaching 6 of a specific position, for example a closed position. However, it is also possible instead for the actuating part to be monitored and for re-standardization to be triggered when the position is reached. In both cases, re-initialization 1 is performed as soon as the respective initialization position is reached. It is disadvantageous here that it is necessary to assume a previously defined initialization position. In the case of actuating parts which are moved continuously between various indeterminate positions, it is therefore rarely or never possible to carry out re-initialization. A further disadvantage is that the initialization process is often associated with a large build up of force at the mechanical system of the window lifter or sunroof, which has disadvantageous effects on the service life of the mechanism.

As an alternative to the re-initialization, any other method can be used for absolute position measurement. The present technology uses in this context, for example, position determination by means of correlation. In a first step 7, a correlation function between a reference characteristic curve $K_{ref}$ which is defined under controlled conditions and a current actual characteristic curve $K_{act}$ which is recorded during the last movements is evaluated and a mean value and an uncertainty value, in the form of a variance, of the position is determined on the basis of the correlation function. The correlation function has essentially the following structure:

The characteristic curves can be, for example, force/travel curves, current/travel curves or rotational speed/travel curves, wherein their differential can also be used. The use of a differential has the advantage that any constant shifts in the characteristic numbers which are caused by a systematic error, for example owing to wear or ambient influences, have less or no influence on the result.

In the form specified here, the functional parameter j represents travel and the parameter i represents a change in travel or travel correction, i.e. the correlation function itself is a function of the travel correction or position correction. The measured position is therefore a sum of the old position and the determined correction value from the correlation function. In order to calculate the shift in position, the correlation function is interpreted as a probability density distribution of a position correction, with the result that the following relationships with the correlation function cov(i) are obtained for the mean value $\mu_{meas}$ and the variance $\sigma^2_{meas}$ of the position:

Alternatively, the shift in position can also be detected by determining the maximum of the correlation function. The measured position value is then again the sum of the shift and of the old value.

The values obtained in this way are finally used together with the current position data in a Kalman filtering process 8. The calculation of the resulting corrected position, i.e. the present mean value $\mu_{new}$ and the new variance $\sigma^2_{new}$, is then carried out on the basis of the following equations:

In the case of a subsequent (further) change 2 in position, the position which is determined in this way is used in that the absolute position which is calculated within the scope of the tracking method 3 is based on the new mean value $\mu_{new}$.

Figure 2:
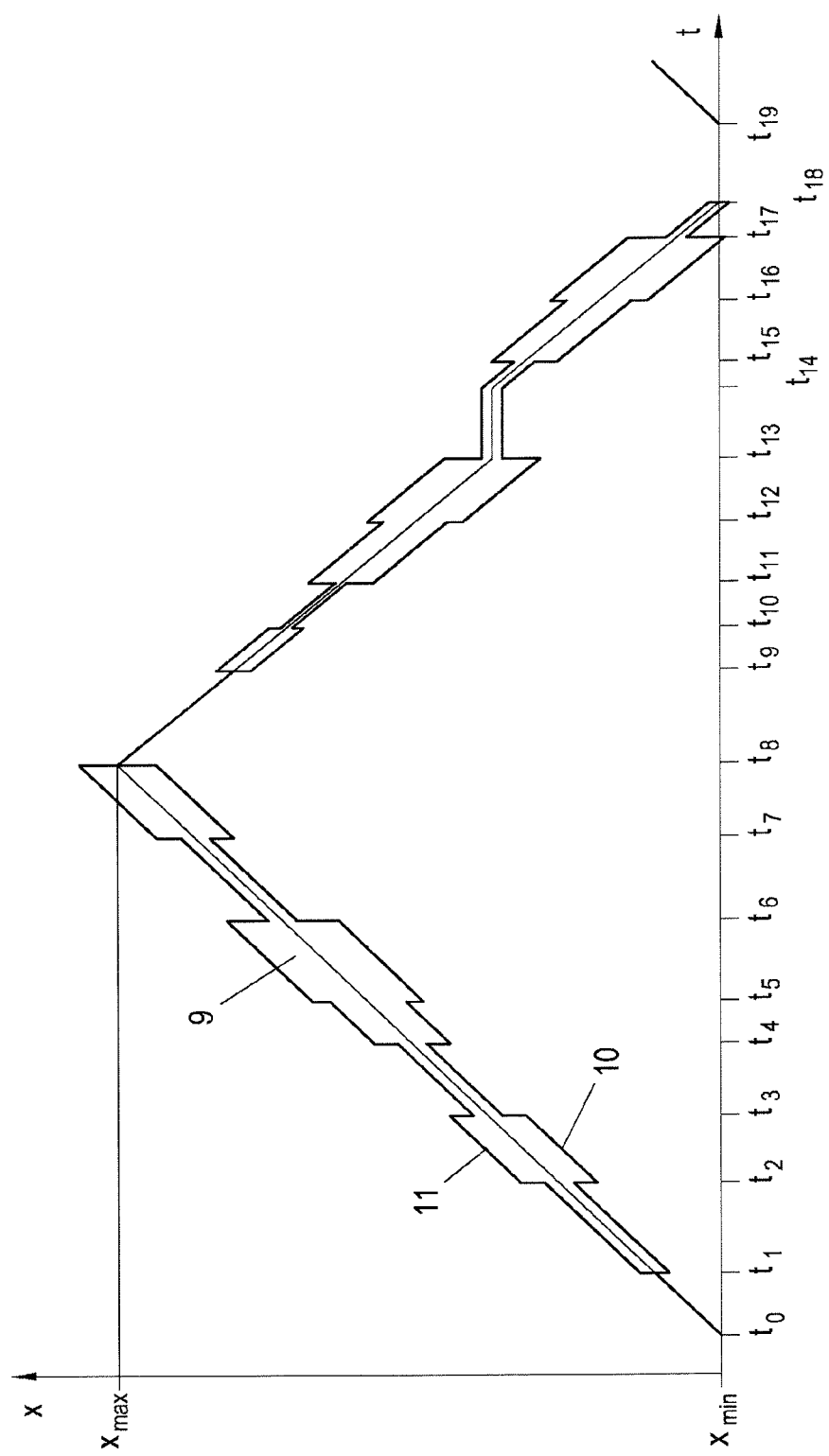
FIG. 2 shows a schematic diagram of the variation of the uncertainty over time during the inventive position determination.

The diagram in FIG. 2 represents schematically the time profile of the uncertainty of the position data. The time or the operational duration is plotted on the abscissa axis and the position of the actuating part on the ordinate axis. The movement of the actuating part is limited mechanically between a minimum position $x_{min}$ and a maximum position $x_{max}$. Between these two positions, the movement is tracked by a method which is subject to errors, which is represented by the stepped profile of the lines 10, 11 which specify an uncertainty interval 9. The lines 10, 11 are arranged symmetrically here underneath and above the current position value. The illustrated profile shows a continuous complete closing movement which starts at the time t0 from an open position $x_{min}$ and extends at the time t8 to a closed position $x_{max}$. Afterwards, the actuating part is opened again completely, but with a short interruption between the times t13 and t14, and it reaches the open position $x_{min}$ again at the time t18 before a renewed closing process starts at the time t19.

The two lines of the diagram follow a stepped profile which makes a jump whenever either the uncertainty value owing to imprecise position tracking has risen (t1, t2, t4, t5, t7, t9, t11, t12, t15, t16) or it has been possible to reduce the uncertainty value owing to absolute position determination (t3, t6, t8, t10, t13, t17, t18). In two of the latter cases (t8, t18) the position determination is a re-initialization, with the result that the uncertainty value has been set to zero. The actuating part was consequently in one of the two mechanically permanently determined and known initialization positions $x_{min}$ or $x_{max}$ at the time of re-initialization (t8, t18). In the other cases (t3, t6, t10, t13, t17) the present method was used instead, with the result that an absolute position which was generally different from $x_{min}$ or $x_{max}$ was determined and it was possible to reduce the uncertainty value. As is apparent from the profile between the first starting process (t0) and the first re-initializations (t8), the uncertainty would remain even without re-initialization within a delimited range, wherein the range remains narrower the more frequently the absolute position determination is carried out, and the more precise this determination is. In contrast to a measurement which is independent of prior knowledge in respect of the position data, in the method according to the invention the position data from the absolute position determination is also used or taken into account by means of characteristic curves. Therefore, in this context a relatively low uncertainty value of the position data can generally be achieved.

Figure 3:
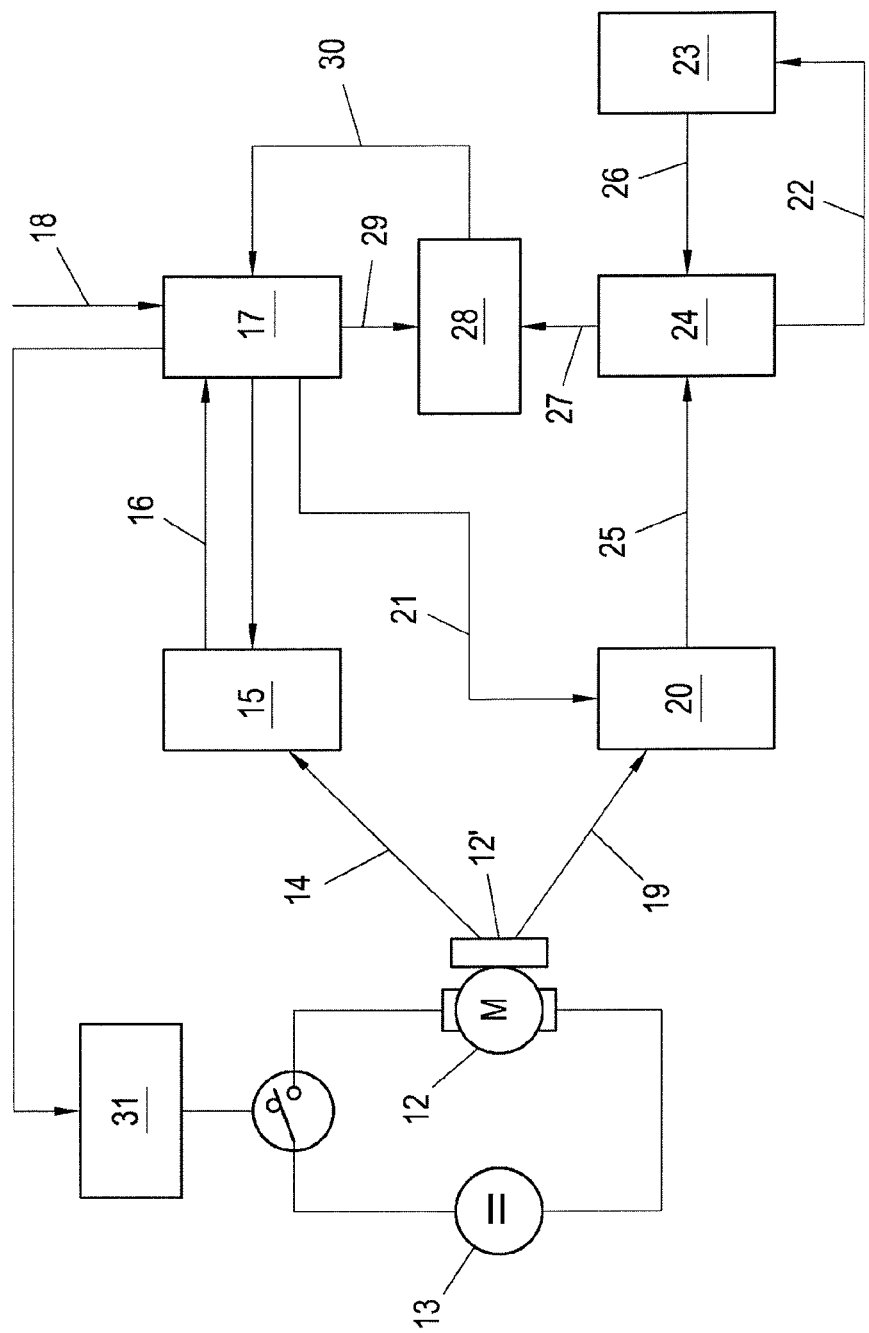
FIG. 3 shows a schematic block circuit diagram of an apparatus for carrying out the method according to the invention.

Finally, FIG. 3 shows a schematic block circuit diagram of an apparatus for carrying out the present method. In this highly simplified illustration, an electric motor 12 is driven by a switched DC source 13 whose priority can be changed. The motor 12 moves, for example, a window, a seat or a sunroof or is part of a window lifter or other comparable control devices. Measurement data 14 is transmitted from the motor 12 or an assigned sensor unit 12' to a position-tracking unit 15 (referred to in an abbreviated form as position tracker). The sensor data or measurement data 14 include, for example, information on the drive current and/or drive voltage, but can also contain measurement results which are obtained by means of specially provided sensors such as Hall sensors. The position-tracking unit 15 is configured to derive or to determine any changes in position from the incoming measurement data, for example relating to the detection of a corresponding motor current ripple. Together with the currently valid position from a position memory 17, a new position value is derived therefrom. In this context, not only the absolute value of the change in position is determined but also the uncertainty value which has come about for example owing to in principle less precise or less consistent measurement data and is assigned to the detected change in position.

The change in position which is detected as a result and its uncertainty value form a position data record 16 which is transmitted to a position memory 17. The position memory 17 stores the absolute position and the absolute uncertainty value assigned to the absolute position, usually in the form of the variance $\sigma^2$ of the absolute position. When the position data record 16 is received, the stored absolute position data is updated in accordance with the detected change and its uncertainty value. Since this is a relative change, the uncertainty value must be increased here in accordance with the uncertainty value of the change.

In the case of an initialization, the position memory 17 receives a reset signal 18. The reset signal 18 causes the absolute position data to be replaced in the position memory 17 by a predetermined initialization data record. Such initialization is performed, for example, at the factory or after the assembly of the control unit by operating the motor 12 on a mechanical block. The initialization data record which is used here contains a position and an uncertainty value of zero in each case, with the result that the two absolute values in the position memory 17 are set to zero.

A second record 19 of measurement data is transmitted from the motor 12 or the sensor unit 12' to a characteristic curve-detection unit 20. The characteristic curve-detection unit 20 also receives the current position data 21 from the position memory 17, with the result that at least one characteristic curve is detected on the basis of the measurement data 19 and the position data 21, and buffered. If the detection of the characteristic curve takes place under controlled conditions, during the initialization or under any other means of ensuring the correctness of the position data, transmission of the characteristic curve 22 which is obtained in this way to a reference characteristic curve memory 23 can be brought about. The reference characteristic curve memory 23 retains the transmitted characteristic curve in a persistent memory, where during normal operation it is protected against writing access operations.

A correlation unit 24 which functions as a position-measuring unit uses both the current actual characteristic curve 25, detected last, of the characteristic curve-detection unit 20 and the reference characteristic curve 26, stored in the memory 23, and determines the correlation function from the two characteristic curves. The correlation unit 24 then uses the calculated correlation function to determine a mean value and a variance of the position deviation between the two characteristic curves. This deviation data 27 is then fed to an averaging unit 28, in particular with a Kalman filter, which averaging unit 28 also loads the current position data 29 (position and uncertainty) from the position memory 17.

The mean value which is specified in the deviation data relates to the current position data, since the characteristic curve-detection unit 20 actually uses this data during the recording of the actual characteristic curve 25. The mean value of the position deviation which is determined from the correlation is therefore only apparently a relative value. In order to determine the current absolute position therefrom, this value is related to the current position value from the position memory 17, but its uncertainty does not have to be taken into account since this uncertainty is already implicitly contained (by means of the actual characteristic curve) in the uncertainty of the deviation. The two absolute position values with the respectively assigned variances are then used in the Kalman filter. The result which is thus obtained from the averaging unit 28 is a new record of absolute position data 30, which replaces the position data stored in the position memory 17. During this process, the uncertainty value of the position data stored in the position memory 17 can only be reduced, since the averaging unit 28 at worst feeds back the existing position data in an unchanged form.

A control unit 31 which controls the operation of the motor 12 accesses the position data stored in the position memory 17 and uses said data, for example, to approach positions determined with the actuating part which is moved by the motor 12, or to detect trapping situations and to provide anti-trapping protection.

A further example of position measurement could be as follows: in the force profile, rotational speed profile or current profile, a characteristic point is identified such as, for example, a strong rise in force such as occurs in the case of wind deflectors of sunroofs. This point always occurs at the same position, for example where the wind deflector engages mechanically in the movement sequence. If the rise in force is detected by a software evaluation, the predefined position is inferred therefrom.

The invention claimed is:

1. A method for determining the position of a motor-driven actuating part, selected from the group consisting of a window, a sunroof, a rear lid, a sliding door or a seat, the method comprising:
   detecting, by at least one sensor coupled to the motor-driven actuating part, a first position of the motor-driven actuating part at a first time and a second position which is a last valid position of the motor-driven actuating part at a second time before the first time,
   determining, by a controller, respective uncertainty values of the first position and the second position, and
   selecting, by the controller, a current position of the motor-driven actuating part between the first position and the second position, the current position being selected closer to whichever one of the first position and second position has a lower value of the respective uncertainty values, and
   controlling, by the controller, a motor based on the current position, to control the motor-driven actuating part relative to a predetermined position.

2. The method as claimed in claim 1, further comprising determining, by the controller, the first position from a correlation function between a reference characteristic curve and an actual characteristic curve.

3. The method as claimed in claim 2, wherein the two characteristic curves are force/travel curves or other characteristic number/travel curves, wherein the characteristic number correlates with the force, for example current/travel curves or rotational speed/travel curves.

4. The method as claimed in claim 2, further comprising:
determining, by the controller, an uncertainty value from the correlation function and
assigning the uncertainty value to the position which is determined from the same correlation function.

5. The method as claimed in claim 1, further comprising determining, by the controller, an uncertainty value of the current position from the uncertainty value of the first position and of the second position.

6. The method as claimed in claim 1, further comprising determining, by the controller, the current position by taking into account the first position and the second position in an inversely proportional fashion with respect to their uncertainty value.

7. The method as claimed in claim 6, further comprising determining, by the controller, the current position and the uncertainty value thereof using a Kalman filter from the first position and from the second position and the respective uncertainty value thereof.

8. The method as claimed claim 1, further comprising initializing before the further change in position, by the controller, the current position and the uncertainty value essentially with zero.

9. The method as claimed in claim 1, further comprising tracking, by the controller, the position of the actuating part by a method which is subject to errors, wherein the uncertainty value of the current position is increased when there is a change in position.

10. The method as claimed in claim 9, wherein the method which is subject to errors is composed of the evaluation of the ripple of the commutator current of a DC motor.

11. The method as claimed in claim 9, wherein the method which is subject to errors is composed of the evaluation of a single Hall sensor which determines, with a magnet wheel attached to the motor, the rotation thereof.

12. An apparatus for determining the position of a motor-driven actuating part, selected from the group consisting of a window, a sunroof, a rear lid, a sliding door or a seat, the apparatus comprising:
a sensor coupled to the motor-driven actuating part and configured to detect a first position of the motor-driven actuating part at a first time and a second position which is a last valid position of the motor-driven actuating part at a second time before the first time; and
a controller coupled to the sensor and a motor of the motor-driven actuating part, the controller configured to:
receive the first position and second position detected by the sensor,
determine respective uncertainty values of the first position and the second position, select a current position of the motor-driven actuating part between the first position and the second position, the current position being selected closer to whichever one of the first position and second position has a lower value of the respective uncertainty values, and
output a control signal to control a motor based on the current position, to control the motor-driven actuating part relative to a predetermined position.

13. The apparatus as claimed in claim 12, wherein the controller is further configured to determine a difference in position.

14. The apparatus as claimed in claim 13, wherein the controller is further configured to record force/travel curves or other characteristic number/travel curves, wherein the characteristic number correlates with the force.

15. The apparatus as claimed in claim 13, wherein the controller is further configured to determine an uncertainty value which is provided for transmission to the averaging unit together with the difference in position.

16. The apparatus as claimed in claim 12, wherein the controller is further configured to process a position uncertainty value specified by the position tracker, and an uncertainty value of the first position.

17. The apparatus as claimed in claim 12, wherein the controller is further configured to execute a Kalman filter.

18. The apparatus as claimed in claim 12, wherein the controller is further configured to initialize the position of the motor-driven actuating part at zero.

19. The apparatus as claimed in claim 12, wherein in order to detect changes in position the controller is connected to a position memory.

20. The apparatus as claimed in claim 12, wherein the controller is further configured to evaluate a ripple of the commutator current of a DC motor.

21. The apparatus as claimed in claim 13, wherein the controller is further configured to record current/travel curves or rotational speed/travel curves.

22. An apparatus for determining the position of a motor-driven actuating part, selected from the group consisting of a window, a sunroof, a rear lid, a sliding door or a seat, the apparatus comprising:
a sensor coupled to the motor-driven actuating part and configured to detect a first position of the motor-driven actuating part at a first time and a second position which is a last valid position of the motor-driven actuating part at a second time before the first time; and
a controller configured to:
determine respective uncertainty values of the first position and the second position, select a current position of the motor-driven actuating part between the first position and the second position, the current position being selected closer to whichever one of the first position and second position has a lower value of the respective uncertainty values,
control a motor based on the current position, to control the motor-driven actuating part relative to a predetermined position, and
evaluate a single Hall sensor which determines, with a magnet wheel attached to the motor, the rotation thereof.

* * * * *